Aug. 25, 1970    D. E. McDERMOTT    3,525,787
PROCESS FOR PRODUCING LOW PERMANENT SHRINKAGE CELLOPHANE
Filed Sept. 26, 1966
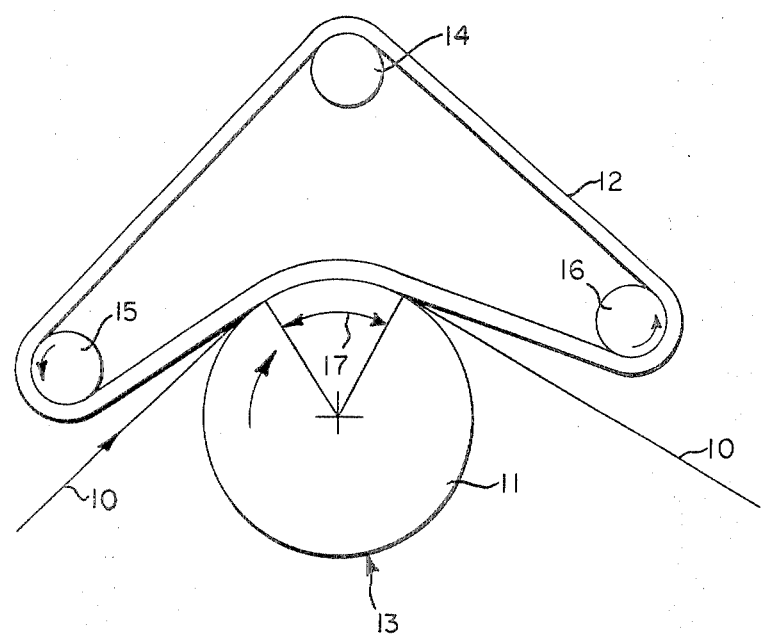
INVENTOR
DANIEL EDWARD McDERMOTT
BY Claude L. Beaudoin
ATTORNEY United States Patent Office 3,525,787
Patented Aug. 25, 1970

3,525,787
PROCESS FOR PRODUCING LOW PERMANENT SHRINKAGE CELLOPHANE
Daniel Edward McDermott, Henrico County, Va., assignor to E. I. du Pont de Nemours and Company, Wilmington, Del., a corporation of Delaware
Filed Sept. 26, 1966, Ser. No. 581,841
Int. Cl. B29c 17/00, 17/02; B29d 7/22
U.S. Cl. 264—284        6 Claims

ABSTRACT OF THE DISCLOSURE

Process for treatment of regenerated cellulose film having reduced machine direction permanent shrinkage including subjecting a film consisting essentially of non-fibrous gel-regenerated cellulose containing at least 35% by weight of plasticizer to normal and shear forces by passing said film between a heated rotating body and an endless belt in cooperative association therewith.

---

The present invention is generally applicable to any web or film of a nonfibrous, water-sensitive cellulosic structure and, because of the prevalance of the viscose process in the cellulosic film manufacturing industry, the present invention will be described hereinafter with specific reference to cellulosic structures that are regenerated from cellulose xanthate. Such structures as films or webs of regenerated cellulose are prepared by extruding an alkaline solution of cellulose xanthate (viscose) through a long, thin casting die or hopper into a sulfuric acid-sodium sulfate coagulation-regeneration bath, which first coagulates the cellulose xanthate as a coherent sheet of film and then decomposes the xantahate to produce a highly swollen, moisture laden gel film of regenerated cellulose. In the customary commercial process, the freshly formed gel film is subsequently passed through a series of liquid treating baths to wash, desulfurize, bleach and plasticize the film structure to remove impurities therefrom and improve its brightness, flexibility and strength. The web is then dried to the final desired plasticizer content.

Regenerated cellulosic film obtained in the manner above-described has been widely accepted as a desirable packaging material, especially because of its transparency. One principal disadvantage or drawback, however, of such material is the fact that regenerated cellulose films are hygroscopic, and packages wrapped therewith which are subjected to an environment of varying humidity and temperature soon lose sales appeal due to the development of adverse physical defects in the cellulosic wrapping film. For instance, defects in the wrapping film such as, for example, rippling, puckering, dimpling and excessive shrinking soon develop due to changes in the temperature and moisture content of its environment. Furthermore, such wrapping films when subjected to severe changes of humidity for extended periods of time have a tendency to lose part of their plasticizer content by evaporation and diffusion. The latter problem, coupled with the inherent shrinkage of about 5% to 6% thereof, often results in crushing of wrapped article and even structural failure of the wrapping film itself as by the splitting thereof. Accordingly, it is the principal object of the present invention to overcome the foregoing problems by providing an improved method for treating film or web structures of regenerated cellulose.

According to the present invention, there is provided a method of manufacture for treating film or web structures of regenerated cellulose which comprises subjecting a gel-regenerated cellulose structure containing at least about 35 weight percent of plasticizer to normal and shear forces by passing said structure beween a heated rotating cylindrical body having a high slip-release surface and a smoothly surfaced endless belt driven by frictional contact with said gel-regenerated cellulose structure. In a preferred embodiment of the present invention, the treated film or web is dried subsequently under tension which is only sufficient to tender said film or web substantially without any stretching thereof.

The nature and the advantages of the present invention will be more clearly understood by the following description thereof and the accompanying drawing which shows in cross-section the general arrangement of an apparatus suitable for treating gel-regenerated cellulosic structures according to the present invention.

As shown in the accompanying drawing, a film or web structure of regenerated cellulose 10 is subjected to normal and shear forces by passing the film or web structure over a heated positively driven roll 11 and under endless resilient belt 12. The roll 11 is suitably journaled for rotation in a carrier frame, not shown, and may be positively driven by any suitable means as, for example, by a conventional chain and sprocket drive assembly or by a gear train. The belt 12 is continuous or endless and is made to pass over idler rolls 14, 15 and 16, as shown in the accompanying drawing. Belt 12 is not independently positively driven, but is driven by frictional contact between its surface and that of roll 11, as may be obtained, for example, by contacting the edge portions thereof directly with the surface of roll 11. Of course, when the film or web 10 is of the same width as belt 12, then it may be said that the film or web 10 drives belt 12, and the web 10 is, in turn, advanced through the treating zone by roll 11. The normal and shear forces to which the gel-regenerated film or web 10 is subjected are applied thereto in the treating area or zone 17 between roll 11 and belt 12.

Roll 11, shown in the accompanying drawing, may be of any suitable material such as, for example, metal, and a necessary and essential feature thereof is that its surface must be smooth and characterized by a high slip-release. By high slip-release is meant a roll surface having low frictional characteristics such as a low coefficient of friction between its surface and that of the gel-regenerated cellulosic film or web passing thereover. Such surface characteristics may be obtained by a metal roll having a highly polished surface and a multitude of indentations randomly distributed thereon each surrounded by highly polished portions of the roll surface, or a roll, preferably of metal, having a covering over its entire surface of a fluorocarbon polymeric material such as Teflon®.

The belt 12 may be of any suitable resilient material, and the only necessary feature thereof is that its surface be smooth. Preferably, belt 12, is fabricated of elastomeric material.

Belt 12 is positioned in cooperative association with roll 11 to engage the surface of the latter in the manner shown in the accompanying drawing, and may be tensilized to any degree in any suitable manner as by moving adjustable and movable idler roll 14 upward or downward, as shown, or by moving roll 11 further against endless belt 12 thereby to increase the angle of wrap of the belt thereagainst. The angle of wrap of the endless belt 12 about roll 11 generally defines the extent of the treating area or zone 17 therebetween. The extent of the treating zone or wrap-angle may vary over a wide range and the method of the invention has been operated successfully with a treating zone corresponding to only about one inch of lineal wrap of endless belt 12 to roll 11.

It has been surprisingly and unexpectedly found that by the method of the present invention it is possible to produce film or web structures of regenerated cellulose that are characterized by machine direction (MD) permanent shrinkage of 1.5% or below without any accompanying creping, crinkling, scratching or damage of the web structure, especially its surface appearance. By MD permanent shrinkage is meant the degree or extent of irreversible shrinkage of regenerated cellulose occurring in the films machine direction of manufacture when it is cycled from an equilibrium moisture content (with its environment) of 6% at 24° C. to an equilibrium moisture content of 60% also at 24° C. and then returned to its initial equilibrium moisture content of 6% at 24° C. The MD permanent shrinkage characteristic of regenerated cellulosic film is objectionable because it results in the gradual shrinkage of the film which, incidentally, is aggravated by being accelerated when the film is subjected to wide fluctuations and variations in the humidity and moisture content of its environment, and results ultimately in the film crushing the articles wrapped therewithin or even bursting of the film when over-tensilized due to the MD permanent shrinkage thereof.

The adverse effects of MD permanent shrinkage have largely been overcome by the process of the present invention wherein the gel-regenerated cellulosic film such as 10 in the accompanying drawing is subjected in the treating zone above described simultaneously to both normal and shear forces. The degree or quantum of normal forces to which film 10 is subjected is dependent upon the degree or extent to which endless belt 12 is tensilized. The shear forces are imposed on film 10 as a result of the difference in the surface speeds of endless belt 12 and roll 11 and the frictional forces that develop between each surface of film 10 in contact with the corresponding surfaces of endless belt 12 and roll 11. The net shear force to which film 10 is subjected also depends upon several other factors such as, for example, the plasticizer content of film 10, the temperatures of the surface of roll 11, the wrap angle of endless belt 12 on roll 11, the nature and character of the surface of roll 11, the nature and character of the surface of endless belt 12, and the degree of tensioning of endless belt 12. Selecting the immediately aforementioned items in accordance with the description thereof set forth herein permits the production of regenerated cellulose films having an MD permanent shrinkage property below 1.5% without any accompanying creping or crinkling of the film structure.

As mentioned hereinbefore, it is necessary that the gel-regenerated cellulosic films treated in accordance with the present invention have an initial plasticizer content of at least 35% by weight, based upon the total weigth thereof. By plasticizer is meant the softening agent employed to soften the dried web. The plasticizer can consist entirely of water or of a combination of water and a softening agent such as glycerin and propylene glycol, in any proportion.

It should, however, be noted that the improvement in the MD permanent shrinkage property is obtainable by the present invention when treating gel-regenerated cellulosic films containing less than 35% by weight of plasticizer. In such cases, however, the treated films have poor optical properties such as, for example, lacking transparency, and have only limited packaging or wrapping applications. There is no theoretical upper limit of moisture or plasticizer content of the films treated according to the method of the present invention. A practical upper limit is found at about 70% by weight of plasticizer content since a film containing more than this amount of plasticizer usually has traces thereof on its surfaces which may cause slipping or momentary loss of sufficient frictional forces between the film and the endless belt 12 and roll 11 and produces a non-uniformly treated film product.

The surface of roll 11 can have a smooth finish of any practical degree to process a gel-regenerated cellulosic film by this invention to obtain the specified improvement in the film's permanent shrinkage characteristic. Metal rolls having a roughened surface finish should be avoided—although such rolls when employed will produce cellulose film having little or no MD permanent shrinkage—since the appearance of the treated film is poor as, for example, being characterized by longitudinal scratches. Surface imperfections on the treated film are avoided by employing a smoothly surfaced roll having a low surface coefficient of friction. Preferred roll surface finishes include a fluorocarbon roll surface and a highly polished surface having a multitude of indentations randomly distributed thereon and each surrounded by highly polished areas. The fluorocarbon covered roll provides a surface which is smooth and relatively soft. Such rolls produce a scratch-free film having the desired permanent shrinkage characteristics. Similar scratch-free film having improved MD permanent shrinkage characteristics may be produced by employing the previously described preferred roll having a uniformly chromium plated surface. The depressions in this type of roll surface are randomly distributed so that no continuous longitudinal or transverse pattern is prevalent and, as will be more fully explained hereinafter, the indentions permit greater quantities of moisture to be vaporized while the gel-regenerated cellulosic film is being treated. A suitable chromium plated roll having surface indentations randomly distributed thereon is described in U.S. Pat. 3,177,558. Also, the surface of the endless belt 12 is smooth. The frictional forces between the surfaces of driven roll 11 and endless belt 12, cooperatively associated therewith, are only those which are sufficient to permit the endless belt to be driven by the roll without visible slippage when operating the apparatus without the gel-regenerated cellulosic film. The frictional forces for any given roll surface/belt surface combination may be varied by adjusting the takeup idler roll 14 shown in the accompanying drawing.

An essential feature of the method of the present invention is that wherein roll 11 is heated. By heating roll 11 a sufficient amount, the moisture in web 10 vaporizes and thereby generates steam. A steam layer is formed between the surface of roll 11 and the surface of film 10. The operating surface temperature of roll 11 must be adequate to vaporize the moisture in the film being treated under the ambient operating conditions. Under normal circumstances, therefore, the temperature of the surface of roll 11 is maintained at 100° C.

In the preferred embodiment of the present invention, the treated film or web is dried under tension which is only sufficient to tenter the film substantially without stretching thereof. Thus, in this instance, control of the speed of the treated film after it leaves the treating unit and enters the succeeding dryer rolls is necessary in order to prevent the film from being unduly stretched. Even only a small amount of overspeed of the dryer rolls, in relation to the speed of the treating unit, is undesirable, since it will cause a continuous stretching of the film which, in turn, results in nullifying the improvements in the treated film. Likewise, too much underspeed of the succeeding dryer rolls will cause excessive slack in the film path which eventually results in the excess film following either the endless belt or the heated roll surface upon being discharged from the treating unit and breaking or rupturing of the film. Suitable drying roll surface speeds are about 3% to 7% lower than the surface speed of the roll in the treating unit. Also, the dryer rolls, if any, located either immediately before or immediately after the treating unit must be located in close proximity thereto in order to provide a minimal unsupported span of the cellulosic film therebetween.

The principle and practice of the present invention will now be illustrated by the following examples which are only exemplary thereof and it is not intended that the invention be limited thereto since modifications in technique and operation will be apparent to anyone skilled in the art. All parts and percentages in the examples are by weight based upon the total weight of the film samples.

The test samples prepared in the following examples were evaluated in accordance with the following testing procedures:

*MD Permanent Shrinkage*, as above defined, is conducted by placing the test sample in a humidity chamber and recording weight change and the machine direction (MD) dimensional changes of the test sample under varying and different humidity conditions. The Permanent Shrinkage value of any test sample is calculated by the following equation:

Permanent Shrinkage $$= \frac{\text{Sample length at start} - \text{Sample length at end}}{\text{Sample length at start}} (\times 100)$$

As above mentioned, Permanent Shrinkage is an important property of packaging films of regenerated cellulose, since it is this property which causes physical damage to a package upon exposure to an environment of varying humidity.

*MD Expansion at 60% Moisture* is the change in the machine direction (MD) dimension of the test sample of regenerated cellulose as between the length thereof at an equilibrium moisture content of 60% at 24° C. and the equilibrium moisture content of 6% at 24° C. at the conclusion of the Permanent Shrinkage test, in relation to the length of the test sample at the equilibrium moisture content of 6% at 24° C. at the start of the Permanent Shrinkage test. The MD Expansion at 60% moisture value of any test sample is calculated by the following equation:

MD Expansion at 60% moisture $$= \frac{\text{Sample length at 60\%} - \text{Sample length at end 6\%}}{\text{Sample length at start 6\% moisture and 24\% C.}}$$
moisture and 24° C.   moisture and 24° C.

EXAMPLE 1

A sample of gel-regenerated cellulosic film obtained from a commercial xanthate process casting machine having a glycerin (softening agent) content of 5.7% and a moisture content of 41% was treated by passing the film through the apparatus shown in the accompanying drawing having a roll similar to that described in U.S. Pat. No. 3,177,558 heated to 100° C. and operating at a surface speed of 35 feet per minute, and a smoothly surfaced endless belt of natural rubber of ¾ inch thickness having a hardness on the Shore scale of 75 Shore "A" wrapped approximately 30° around the surface of the roll. The treated film having a moisture content of 15% was further dried to a final moisture content of 7% by passing the film over heated rolls.

The treated and dried film sample was evaluated for both MD Permanent Shrinkage and MD Expansion at 60% moisture, and the results are listed in Table 1 herebelow.

As a control, a sample of the above described gel-regenerated cellulosic film was dried to a final moisture content of 7% over heated rolls without first being subjected to the method of the invention. The control sample was evaluated for both MD Permanent Shrinkage and MD Expansion at 60% moisture and the results also are listed in Table 1 below.

TABLE 1

| Example | MD permanent shrinkage, percent | MD expansion at 60% moisture, percent |
|---|---|---|
| 1 | 1.1 | 2.2 (expansion) |
| Control | 3.0 | 0.1 (shrinkage) |

EXAMPLES 2–12

The procedure described in Example 1 was repeated using samples of gel-regenerated cellulosic films each having different amounts of plasticizer material incorporated thereinto as shown in Table 2 herebelow. Each sample was evaluated for MD Permanent Shrinkage and MD Expansion at 60% moisture, and the results also are listed in Table 2 below.

TABLE 2

| Example | Plasticizer content, percent | MD permanent shrinkage, percent | MD expansion at 60% moisture, percent |
|---|---|---|---|
| 2 | 11.0 | 2.5 | 0.8 (expansion) |
| 3 | 18.2 | 2.7 | 0.9 Do. |
| 4 | 38.4 | 1.4 | Do. |
| 5 | 42.3 | 1.0 | 2.3 Do. |
| 6 | 42.6 | 0.8 | Do. |
| 7 | 43.0 | 1.0 | Do. |
| 8 | 55.6 | 0.5 | Do. |
| 9 | 58.4 | 1.4 | 2.2 Do. |
| 10 | 63.7 | 2.1 | 1.1 Do. |
| 11 | 64.8 | 2.4 | 0.9 Do. |
| 12 | 68.4 | 2.2 | 1.4 Do. |

EXAMPLES 13–20

The procedures of Examples 2–12 are repeated using a roll in the treating unit having its entire surface covered with a 0.004-inch layer of Teflon® having a surface finish of 16 microinches (r.m.s.). The samples were evaluated for MD Permanent Shrinkage and MD Expansion at 60% moisture, and the results are listed in Table 3 herebelow.

TABLE 3

| Example | Plasticizer content, percent | MD permanent shrinkage, percent | MD expansion at 60% moisture, percent |
|---|---|---|---|
| 13 | 6.4 | 4.0 | 0.4 (shrinkage) |
| 14 | 28.6 | 3.9 | 0.2 Do. |
| 15 | 38.8 | 1.3 | 2.2 (expansion) |
| 16 | 40.9 | 1.1 | Do. |
| 17 | 52.0 | 1.9 | 1.3 Do. |
| 18 | 59.8 | 1.8 | 1.4 Do. |
| 19 | 64.1 | 2.2 | 1.0 Do. |
| 20 | 66.0 | 2.5 | 1.4 Do. |

What is claimed is:

1. A method of manufacture for preparing film structures of regenerated cellulose having reduced machine direction permanent shrinkage comprising subjecting a film structure consisting essentially of nonfibrous gel-regenerated cellulose containing at least about 35% by weight, based upon the total weight thereof, of plasticizer to normal and shear forces by passing said film structure between a heated rotating body having a high slip-release surface and an endless belt in cooperative association with said rotating body and driven by frictional contact therewith.

2. The method of claim 1 wherein the gel-regenerated cellulose film structure is characterized by an initial plasticizer content of between about 35% and 60% by weight, based upon the total weight thereof.

3. The method of claim 1 wherein the gel-regenerated cellulose film structure is heated to a temperature between about 95° C. and about 105° C. prior to and while passing over said rotating body.

4. A method of manufacture for preparing film structures of regenerated cellulose having reduced machine direction permanent shrinkage comprising subjecting a film structure consisting essentially of nonfibrous gel-regenerated cellulose containing at least about 35% by weight, based upon the total weight thereof, of plasticizer to normal and shear forces by passing said film structure over a heated rotating body having a high slip-release surface and between an endless belt in cooperative association with said rotating body and driven by frictional contact therewith, and thereafter drying said regenerated cellulose film structure under tension only sufficient to tenter said film structure substantially without any stretching thereof.

5. The method of claim 4 wherein the gel-regenerated cellulose film structure is characterized by an initial plasticizer content of between about 35% and 60% by weight, based upon the total weight thereof.

6. The method of claim 4 wherein the gel-regenerated cellulose film structure is heated to a temperature between about 95° C. and about 105° C. prior to and while passing over said rotating body.

References Cited

UNITED STATES PATENTS

| | | | |
|---|---|---|---|
| 2,115,132 | 4/1938 | Alles et al. | 264—198 |
| 1,974,755 | 9/1934 | Schur | 260—218 |
| 2,177,659 | 10/1939 | Kimble et al. | 264—280 |
| 2,624,245 | 1/1953 | Cluett. | |
| 2,970,345 | 2/1961 | Wongner | 264—284 |
| 3,157,723 | 11/1964 | Hochberg | 264—284 |
| 3,329,556 | 7/1967 | McFalls et al. | 264—280 |

ROBERT F. WHITE, Primary Examiner

J. R. THURLOW, Assistant Examiner

264—175, 198, 285; 162—206; 260—218, 264